(12) United States Patent
Zhou

(10) Patent No.: US 9,727,104 B2
(45) Date of Patent: Aug. 8, 2017

(54) VARIOUS PSUS ADAPTIVE SERVER AND METHOD

(71) Applicants: INVENTEC (PUDONG) TECHNOLOGY CORPORATION, Shanghai (CN); INVENTEC CORPORATION, Taipei (TW)

(72) Inventor: Chunpeng Zhou, Shanghai (CN)

(73) Assignee: INVENTEC (PUDONG) TECHNOLOGY CORPORATION, Taipei (TW)

(*) Notice: Subject to any disclaimer, the term of this patent is extended or adjusted under 35 U.S.C. 154(b) by 415 days.

(21) Appl. No.: 14/256,415

(22) Filed: Apr. 18, 2014

(65) Prior Publication Data

US 2015/0149793 A1 May 28, 2015

(30) Foreign Application Priority Data

Nov. 28, 2013 (CN) .......................... 2013 1 0626957

(51) Int. Cl.
*G06F 1/26* (2006.01)

(52) U.S. Cl.
CPC ..................................... *G06F 1/26* (2013.01)

(58) Field of Classification Search
None
See application file for complete search history.

(56) References Cited

U.S. PATENT DOCUMENTS

| | | | | |
|---|---|---|---|---|
| 5,754,798 A * | 5/1998 | Uehara | ................. | G06F 1/3203 713/320 |
| 5,987,614 A * | 11/1999 | Mitchell | ............... | G06F 1/3203 713/300 |
| 2007/0260918 A1* | 11/2007 | Okada | ....................... | G06F 1/30 714/14 |
| 2011/0107120 A1* | 5/2011 | Nakashima | ............. | G06F 1/263 713/300 |
| 2012/0131394 A1* | 5/2012 | Hsu | ..................... | G06F 11/3051 714/57 |

* cited by examiner

*Primary Examiner* — Kim Huynh
*Assistant Examiner* — Joshua Neveln
(74) *Attorney, Agent, or Firm* — Bacon & Thomas, PLLC

(57) ABSTRACT

A various PSUs adaptive server and method used therefor, in which the management module sends a detection command to the bus address corresponding to the model corresponding to each of the PSUs, identifies the model according to the bus address in the response information and controls the one of the PSUs corresponding to the identified model by using the control protocol corresponding thereto, whereby reducing a number of the versions of a base plate management controller and reducing a test burden therefor.

8 Claims, 4 Drawing Sheets

VARIOUS PSUS ADAPTIVE SERVER AND METHOD

BACKGROUND OF THE INVENTION

Field of Invention

The present invention pertains to a various power supply units (PSUs) adaptive sever and method, and particularly to a various PSUs adaptive server and method used therefor, in which a model of each of a plurality of power modules is identified according to a bus address of each of the power modules so that various PSUs may be adaptively used in the server.

Related Art

Power supply unit (PSU) is an element to a computer server, which converts an alternative current (AC) power into a direct current (DC) power, by which the other elements in the computer server may operate normally.

Presently, there are many kinds of power supply, and each has its control protocol. Correspondingly, a base plate management controller is provided to support IP protocols for the power supplies used in the computer server, so that the base plate management controller may control the power supplies to each supply an electric power to the computer server by using a proper control protocol.

However, this may require the base plate management controller to support various kinds of power supplies in the server, and thus the versions of base plate management controllers also increase in response thereto. This may result in a complex control and management of the base plate management controllers and even tests for the computer server may bear an increased load.

In view of the above, there is a need to solve the issue of too many versions of base plate management controller required in the prior art.

SUMMARY OF THE INVENTION

In view of the issue of too many versions of base plate management controller required in the prior art, the present invention discloses a various power supply units (PSUs) adaptive server and method.

The An various power supply units (PSUs) adaptive method applied to a server comprising a management module, comprising steps of: pre-setting a plurality of association information sets, each corresponding to a model of one of a plurality of PSUs and each model corresponding a different bus address and a control protocol for the model of the one of the plurality of PSUs; arranging at least one of the plurality of PSUs in the server, and setting the bus address according to the model of each of the plurality of PSUs corresponding thereto; sending a detection command by the management module to the plurality of bus address to request a response from the plurality of PSUs corresponding thereto, after the server is powered up, to wait the response from the plurality of PSUs, identifying the model of each of at least one of the plurality of PSUs according to the bus address the response from sending back the identified model information; and controlling the PSU to supply an electric power to the server by the management module according to the control protocol corresponding to the model.

The various PSUs adaptive method applied onto a server comprising a management module, a plurality of PSUs, each having a bus address and belonging to a model corresponding to the line address, respectively; and a management module, being pre-arranged a plurality of association information sets, each comprising the bus address and a control protocol for the model of the one of the plurality of PSUs corresponding thereto, sending a detection command to request a response from the plurality of PSUs according to the bus address for the model of the one of the plurality of PSUs corresponding thereto, after the server is powered up, to receive at least a response information from the plurality of PSUs, identifying the model of each of at least one of the plurality of PSUs according to the bus address in the response information, sending back the identified model; and controlling the power module to supply an electric power to the server by the management module according to the control protocol corresponding to the model.

The server and method of the present invention have the differences as compared to the prior art that the management module sends a detection command to the bus address corresponding to the model corresponding to each of the power modules, identifies the model according to the bus address in the response information and controls the one of the power modules corresponding to the identified model by using the control protocol corresponding thereto, whereby solving the issue encountered in the prior art by achieving in technical efficacies of reducing a number of the versions of the base plate management controller and reducing a test burden therefor.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The resent invention will be apparent from the following detailed description, which proceeds with reference to the accompanying drawings, wherein the same references relate to the same elements.

The present invention may enable a server having various power modules therein to automatically identify a model of each of the power modules, and the server may be provided an electric power from the right one among the power modules to operate normally by using a proper control protocol corresponding to the model.

Figure 1:
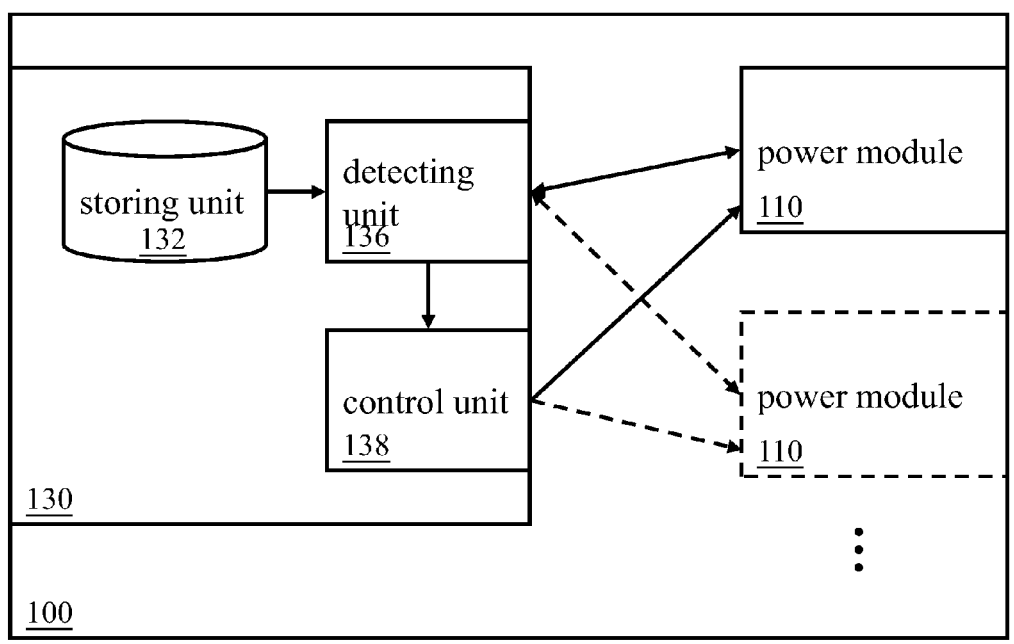
FIG. 1 is a schematic diagram of elements of a various PSUs adaptive server according to the present invention.

Referring to FIG. 1, a schematic diagram of elements of a server various PSUs adaptive server according to the present invention is shown therein, by which the operation of the present invention may be well understood with the related description.

As shown, the server 100 of the present invention comprises a plurality of power modules 110 and a management module 130. Each of the power modules 110 has its bus address.

Generally, the power modules 110 having the same model have the same bus address, while the power modules 110 having different categories have different bus addresses. However, this is only an example, without limiting the present invention. For example, each of the power modules 110 may have different bus addresses. In the present invention, the power modules 110 are categorized according to their one or more parameters. For example, an output power is used as a reference for categorization, the same model of power modules 110 have the same output power and the different categories of power modules 110 have the different output powers. However, this is only an example, without limiting the present invention. For example, a manufacturing provider or a containing element corresponding to the subject power modules 110 may also be used as a reference for categorization.

The power modules 110 each supply an electric power to the server 100. Generally, after the server 100 is powered up by an external power source, the power module 110 transforms the external power into the power required by the elements of the server 100, so that the server 100 may work normally.

One server 100 may have one or more power modules 110 disposed therein, without any particular limitation in the present invention. In most embodiments, the power modules 110 is typically an electric power supply unit (PSU), without limiting the present invention.

The management module 130 controls the power modules 110 to supply an electric power to the server 100. Further, the management module 130 also comprises a storing unit 132, a detecting unit 136, and a control unit 138.

In the storing unit 132, a plurality of association information sets are recorded, each corresponding to a model of the power modules 110. Further, each of the association information sets includes a main address and a control protocol of one of the power modules 110 corresponding thereto. For the control protocol of the association information set, it may be used to control the power module 110 belonging to the model corresponding to the association information set, so that the power module 110 may be controlled to supply an electric power to the server 100.

In addition, the storing unit 132 in some embodiments may store an identified model of the power module 110 into an identified list. In some embodiments, the storing unit 132 may store the bus address associated with the model of the power module 110, without limiting thereto in the present invention. For example, the storing unit 132 may also store a corresponding model ID number for each model.

The detecting unit 136 may, after the sever 100 is powered up, read the bus address contained in the association information recorded in the storing unit 132, and transmit to the bus address a detection command, whereby requesting the power module 110 having the bus address in the server 100 to respond. Generally, the detecting unit 136 literally selects one among all the bus addresses recorded in the storing unit 132, and then sends to these bus addresses one by one. In the case that the detecting unit 136 does not receive a response information after a predetermined time period from the selected bus address, the detecting unit 136 will locate the power modules 110 without being arranged to use in the server and being selected for its bus address. Further, the detecting unit 136 reselects another one among all the bus addresses recorded in the storing unit 132 having not been sending the detection command to, and re-sends the detection command to the re-selected bus address. This process is repeated until all the bus addresses recorded in the storing unit 132. However, the detection command transmission policy of the detecting unit 136 is not limited to what the above example operates.

The detecting unit 136 also identifies the model of the power module 110 having and corresponding to the bus address having the response information transmitted back, and reads a control protocol of this identified model from the storing unit 132 for the corresponding power module 110. In practice, the detecting unit 136 may determine which bus address among the all the response information is transmitted by. Correspondingly, the detecting unit 136 may also read the control protocol according to the bus address having the response information transmitted back for the power module model.

In some embodiments, the detecting unit 136 may detect if any new power module 110 is found which does not belong to the identified model list in the operation of the sever 100. If so, the detecting unit 136 may transmit a detection command to the bus address recorded in the storing unit 132, so that it may request the new power module to respond. When the response information is received from the new power module, the detecting module 136 identifies the new power module according to the bus address in the response information.

The control unit 138 controls the power module detected by the detecting unit 136 according to the control protocol corresponded by the model of the power module detected by the detecting unit 136, so that the detected power module may supply an electric power to the server 100.

In some embodiments, the control unit 138 may issue a shut-down command to stop the server 100 to operate when the detecting unit 136 can not identify the model of any power module arranged in the server 100, i.e. all the power modules 110 can not be totally controlled.

Figure 2A:
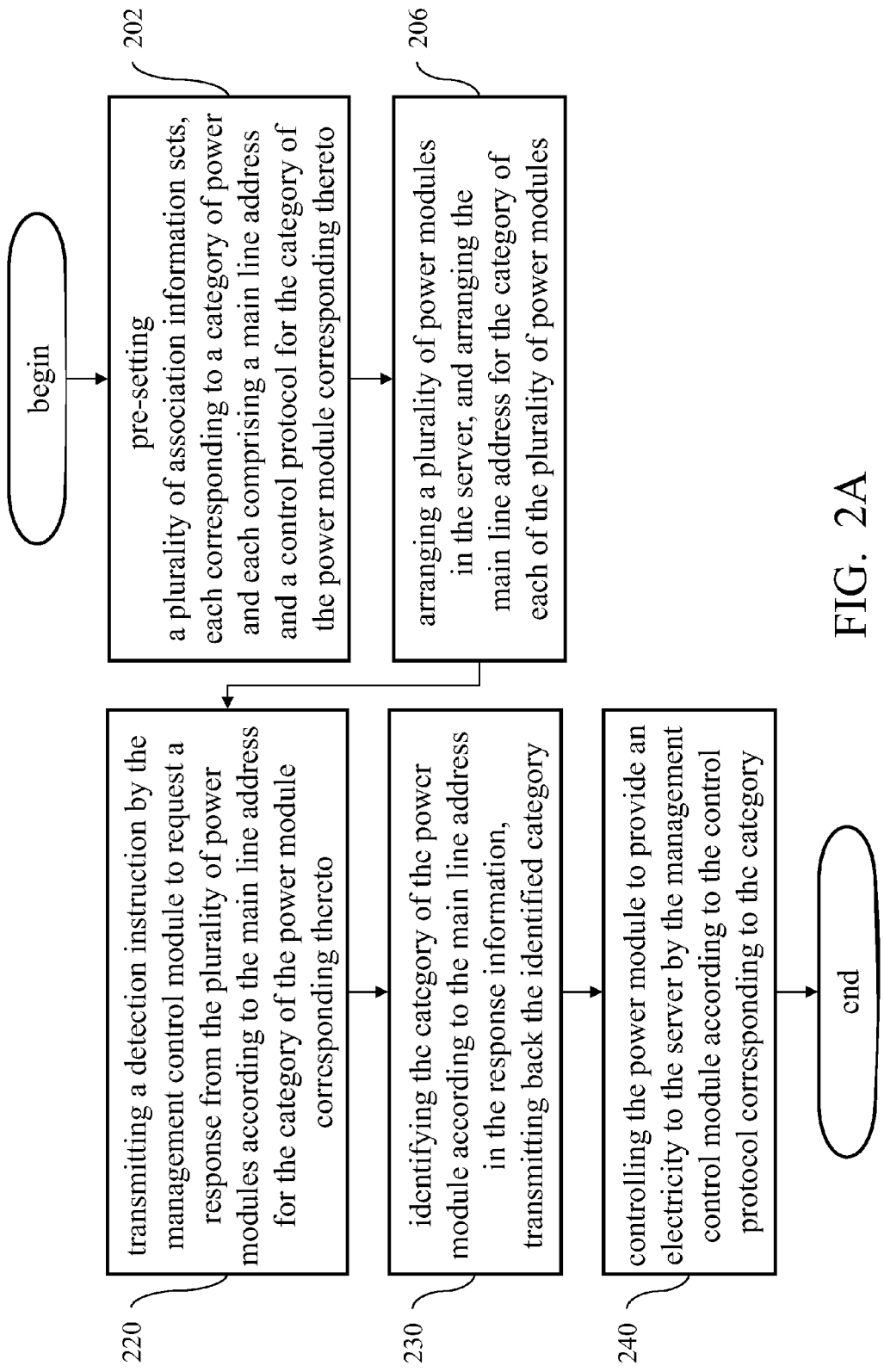
FIG. 2A is a flowchart diagram of a various PSUs adaptive method applied onto a server according to the present invention.

Next, an embodiment is set forth to explain the operation of the system and method of the present invention, with reference to FIG. 2A, in which the various PSUs method according to the present invention. In this embodiment, assume the power modules 110 have the three categories of 460 W, 750 W, and 1200 W, respectively, without limiting the present invention.

At first, a user has to set association information sets in the management module 130 in the server 100 (S202). In this embodiment, assume the management module 130 is a base management controller (BMC), and the user may write the three sets of association information into the storing unit 132 in the management module 130, the three sets of association information being the bus address and control protocol, respectively.

Figure 2B:
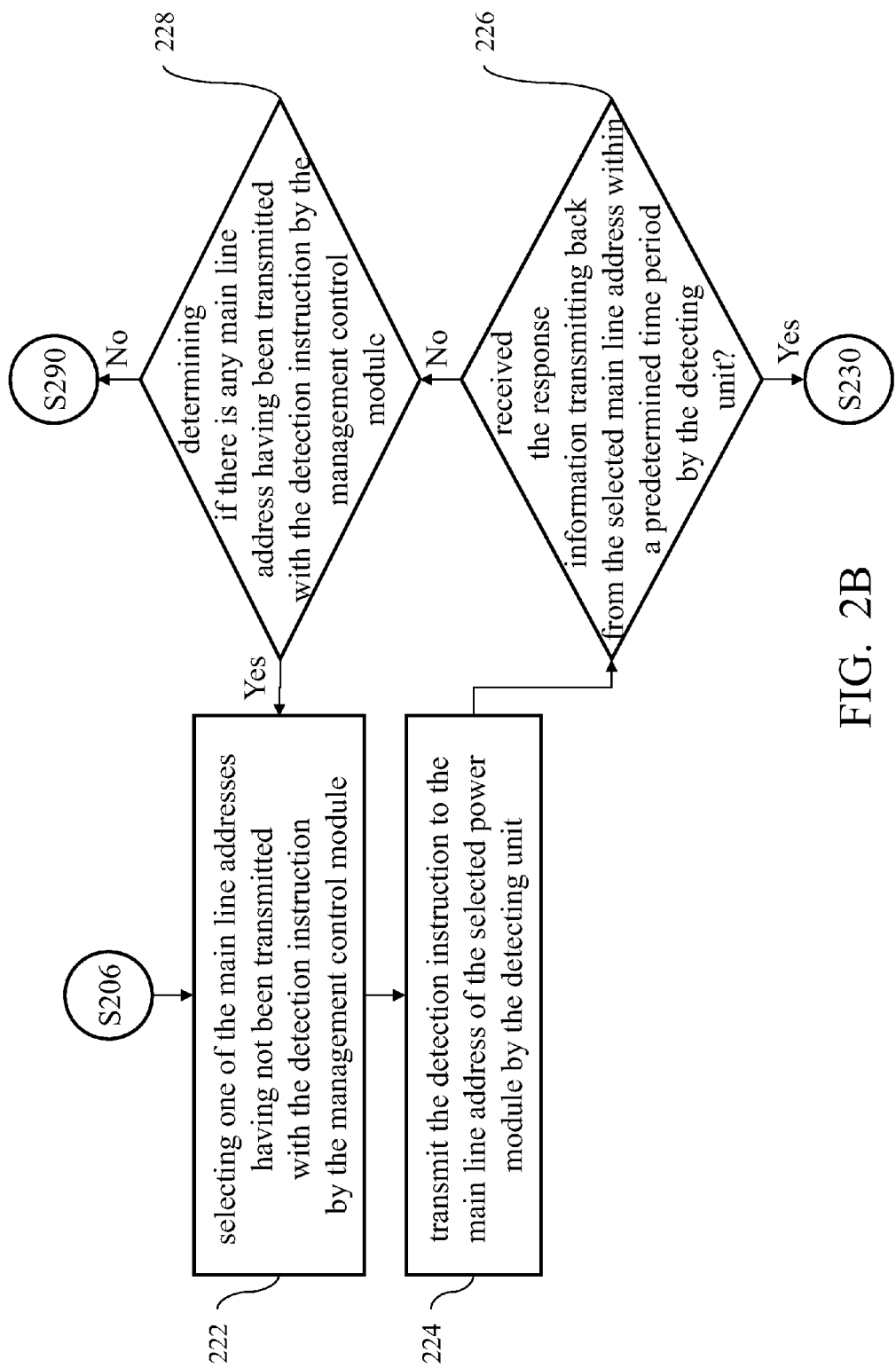
FIG. 2B is a flowchart diagram of a detailed method of sending a detection command according to the present invention.

After the server 100 is arranged with the power modules 110 (S206), then the management module 130 may transmit the bus addresses recorded a detection command, respectively, so as to request the power modules 110 in the server 100 to respond (S220). In this embodiment, assume the management module 130 may read out the three association information sets recorded in the storing unit 132 from the detection unit 132, and select one of the bus addresses recorded in the three association information sets having not been transmitted with the detection command (S222), in the manner shown in the process of FIG. 2B. If the detecting unit 136 selects the bus address of the power module of 460 W as its output power first, it may transmit the detection command to the bus address of the power module of 460 W output power (S224). Thereafter, the detecting unit 136 may wait for a response information, and continuously detect if a predetermined time period has been reached in the course of waiting of the response information. If the detecting unit 136 detects that the predetermined time period has been reached, and the detecting unit 136 does not receive the response information form the bus address of the power module of 460 W output power (S226), the detecting unit 136 will reselect one among the bus addresses recorded in the three association information sets having been not transmitted with the detection command. In this embodiment, since the bus address of the power module of output power 460 W has received the detection command, the detecting unit 136 will reselect one from the bus addresses of the power modules of 750 W and 1,200 W output power. And, the process is repeated.

If the detecting unit 136 of the management module 130 has transmitted the detection command to all the power modules of 460, 750, and 1200 W output power, and does not receive any response information from them, the detecting unit 136 will determine that there is no nay bus address without being transmitted with the detection command (S228). This indicates that the detecting unit 136 cannot identify the power modules in the server 100. At this time, the control unit 138 in the management module 130 may issue a shut-down command, so as to stop the server 100 to operate (S290).

Now referring back to FIG. 2A, after the detecting unit 136 in the management module 130 sends the detection command to the bus address, the detecting unit 136 may identify the model of the power module having transmitted back the response information according to the corresponding bus address (S230). In this embodiment, assume the server 100 has the power module of 750 W output power arranged therein, after the detecting unit 136 sends the detection command to the bus address of the power module of 750 W output power, it may receive the response information from the bus address of the power module of 750 W output power and identify the power module which has the response information as being 750 W for its output power.

Thereafter, the control unit 138 in the management module 130 may control the power module having sending back the response information to supply an electric power to the server 100 according to the control protocol corresponded by the identified model (S240), i.e. the control unit 138 may control the power module of 750 W output power to supply an electric power to the server 100 in this embodiment.

And if the power module arranged in the server 100 has the output power of 460 W or 1,200 W, after the detecting unit 136 sends the detection command to the bus address of the power module having the output power 460 W or 1,200 W, the response information is similarly transmitted back from the bus address of the power module having the output power 460 W or 1,200 W. Correspondingly, the control unit 138 may similarly control the power module having the output power 460 W or 1,200 W to supply an electric power to the server 100 according to the control protocol corresponding to the power module having the output power 460 W or 1,200 W. In view of the description, no matter which model the power module 110 adopted in the server 100 belongs to, the management module 130 may automatically select the correct control protocol corresponding to the power module 110 to control the power module 110 to supply an electric power to the server 100, to maintain normal operation of the server 100.

Figure 2C:
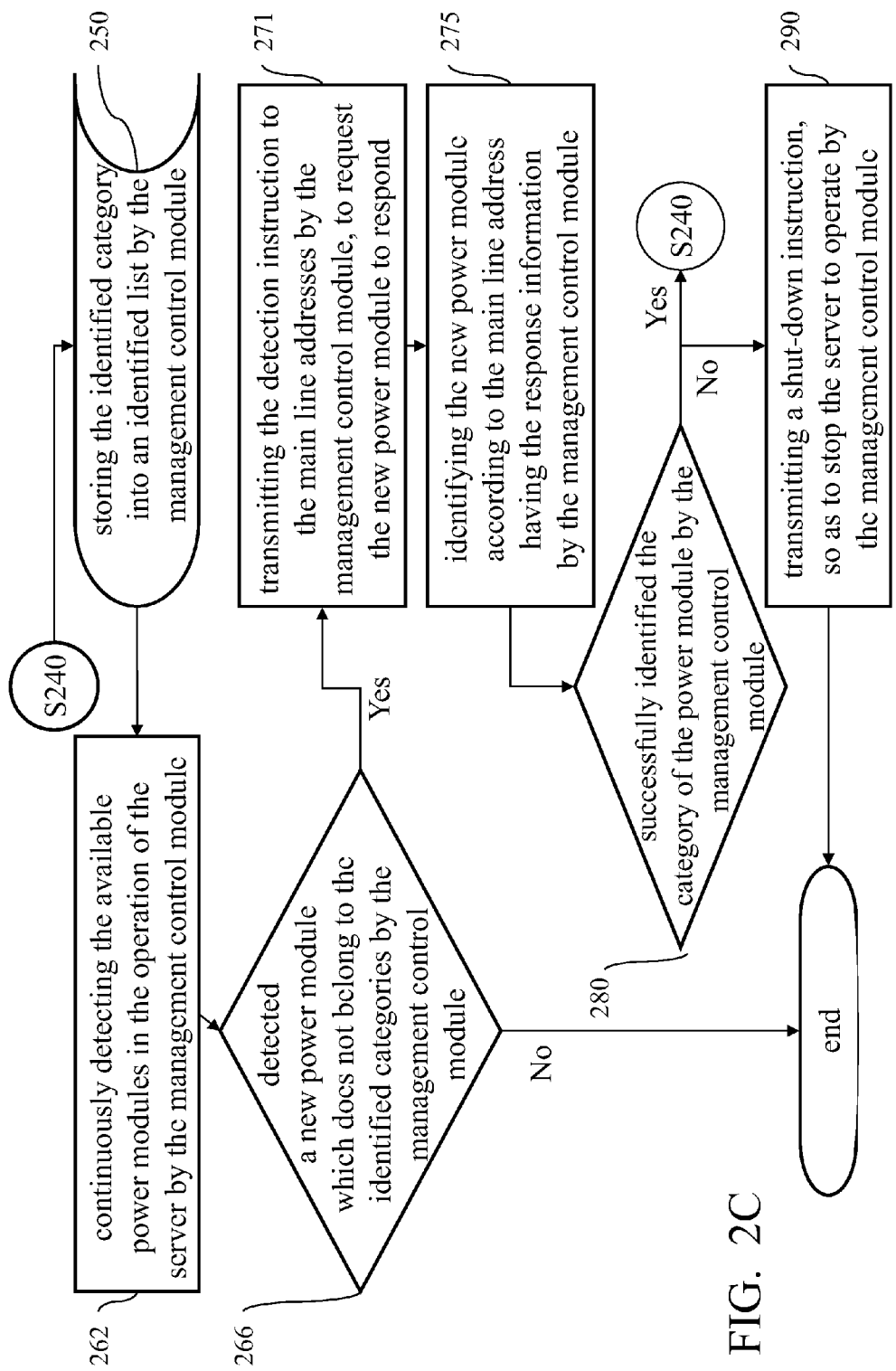
FIG. 2C is a flowchart diagram of an additional method of the various PSUs adaptive method applied onto the server according to the present invention.

In addition, as shown in FIG. 2C, after the management module 130 controls the power module having transmitted back the response information according to the control protocol corresponding to the identified model to supply an electric power to the server 100 (S240), the storing unit 132 of the management module 130 may store the identified model into the identified list (S250).

The detecting unit 136 of the management module 130 may also continuously detect the available power modules in the operation of the server 100 (S262). If the detecting unit 136 detects a new power module which does not belong to the identified categories (S266), the detecting unit 136 may transmit the detection command to the bus addresses contained in the association information sets recorded in the storing unit 132, to request the new power module to respond (S271), and identify the new power module according to the bus address having the response information (S275). This process is similar to the afro-mentioned steps S220 to S230.

If the detecting module 136 of the management module successfully identify the model of the new power module (S280), the control unit 138 in the management module 130 may control the new power module according to the control protocol corresponding to the identified model to supply an electric power to the server 100 (S240).

And if the detecting module 136 of the management module 130 cannot identify the model of the new power module (S280), the control unit 138 in the management module 130 may transmit a shut-down command, so as to stop the server 100 to operate (S290).

In view of the above, the present invention have the differences as compared to the prior art that the technical means which the management module sends a detection command to the bus address corresponding to the model of each of the power modules, identifies the model according to the bus address in the response information and controls the one of the power modules corresponding to the identified model according to the control protocol corresponding thereto are provided, whereby solving the issue of too many base management controller versions by achieving in technical efficacies of reducing a number of the versions of the base plate management controller and reducing a test burden therefor.

Furthermore, the various PSUs adaptive method according to the present invention may be implemented in a hardware, a software or a combination thereof. Alternatively, the method may also be implemented in a single unit or separate computer systems connected with one another with discrete components arranged therein.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

The invention claimed is:

1. A various power supply units (PSUs) adaptive method applied to a server comprising a management module of a base plate management controller, comprising steps of:
   pre-setting a plurality of association information sets, each corresponding to a model of one of a plurality of PSUs and each model corresponding to a different bus address and a control protocol for the model of the one of the plurality of PSUs in the management module;
   arranging at least one of the plurality of PSUs in the server, and setting the bus address according to the model of each of the plurality of PSUs corresponding thereto;
   sending a detection command by the management module to the plurality of bus address to request a response from the plurality of PSUs corresponding thereto, after the server is powered up, to wait for the response from the plurality of PSUs, identifying the model of each of at least one of the plurality of PSUs according to the bus address from the response sending back the identified model information;

controlling the PSU to supply an electric power to the server by the management module according to the control protocol corresponding to the model; and sending a shut-down command to shut down the server, when no response from any one of the plurality of PSUs occurs.

2. The various PSUs adaptive method as claimed in claim 1, further comprising, after the step of sending back the identified model information, a step of:

storing the identified model information in an identified PSU list by the management module.

3. The various PSUs adaptive method as claimed in claim 1, further comprising, after the step of sending back the identified model information, steps of:

sending a detection command to the plurality of bus address to request a respond, when the management module detects a new PSU not identified yet in the course of the server's operation;

identifying the model according to the bus address the response from; and controlling the new PSU to supply electric power to the server by the management module according to a control protocol corresponding to the model.

4. The various PSUs adaptive method as claimed in claim 1, wherein the step of sending a detection command by the management module to request the response from the plurality of PSUs corresponding thereto comprises steps of:

selecting a bus address of the plurality of models corresponding thereto and sending a detection command to the selected bus address; and re-selecting the bus address of the plurality of models corresponding thereto, when the management module does not receive the response within a predetermined time and sending the detection command to the re-selected bus address.

5. A various power supply units (PSUs) adaptive server comprising:

a plurality of PSUs, each having a bus address and belonging to a model corresponding to the line address, respectively; and a management module of a base plate management controller, being pre-arranged a plurality of association information sets, each comprising the bus address and a control protocol for the model of the one of the plurality of PSUs corresponding thereto, sending a detection command to request a response from the plurality of PSUs according to the bus address for the model of the one of the plurality of PSUs corresponding thereto, after the server is powered up, to receive at least a response information from the plurality of PSUs, identifying the model of each of at least one of the plurality of PSUs according to the bus address in the response information, sending back the identified model; and controlling the power module to supply an electric power to the server by the management module according to the control protocol corresponding to the model, wherein the management module further sends a shut-down command to stop the server to operate, when the model corresponding to the bus address in the response information is not identified by the management module.

6. The various PSUs adaptive server as claimed in claim 5, wherein the management module further stores the identified model into an identified model list.

7. The various PSUs adaptive server as claimed in claim 5, wherein the management module further sends a detection command to the bus address corresponding to a new power module to request the new power module to respond, when detecting a model corresponding to the bus address other than the identified model list in the course of the server's operation;

identifying the model corresponding to the bus address other than the identified model list according to the bus address; and controlling the new power module to supply an electric power to the server by the management module according to a control protocol corresponding to the model.

8. The various PSUs adaptive server as claimed in claim 5, wherein the management module selects first the bus address for the model of the one of the plurality of PSUs corresponding thereto and then sends the detection command to the selected bus address, and re-selects the bus address for the model of another one of the plurality of PSUs corresponding thereto, when the management module does not receive the response information within a predetermined time, and sends the detection command the detection command to the re-selected bus address.

* * * * *